US011288001B1

(12) United States Patent
Rider et al.

(10) Patent No.: US 11,288,001 B1
(45) Date of Patent: Mar. 29, 2022

(54) SELF-CLEARING DATA MOVE ASSIST (DMA) ENGINE

(71) Applicant: International Business Machines Corporation, Armonk, NY (US)

(72) Inventors: Scot Rider, Pleasant Valley, NY (US); Marcel Schaal, Fort Montgomery, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 17/111,570

(22) Filed: Dec. 4, 2020

(51) Int. Cl.
*G06F 3/00* (2006.01)
*G06F 3/06* (2006.01)

(52) U.S. Cl.
CPC .......... *G06F 3/0647* (2013.01); *G06F 3/0604* (2013.01); *G06F 3/0646* (2013.01); *G06F 3/0655* (2013.01); *G06F 3/0679* (2013.01)

(58) Field of Classification Search
CPC .... G06F 3/0646; G06F 3/0647; G06F 3/0604; G06F 3/0655; G06F 3/0679
See application file for complete search history.

(56) References Cited

U.S. PATENT DOCUMENTS

| 10,120,579 | B1 | 11/2018 | Patiejunas et al. |
| 2008/0195821 | A1* | 8/2008 | Adams ................ G11C 29/12 711/154 |
| 2008/0290914 | A1 | 11/2008 | Chard et al. |
| 2016/0283415 | A1* | 9/2016 | McBride ............ G06F 13/1642 |
| 2019/0138453 | A1 | 5/2019 | Bennett et al. |

OTHER PUBLICATIONS

N.Y. Ahn, "Duty to Delete on Non-Volatile Memory" https://arxiv.org/abs/1707.02842, Jul. 7, 2017, 3 pages.

* cited by examiner

*Primary Examiner* — Reginald G Bragdon
*Assistant Examiner* — Michael L Westbrook
(74) *Attorney, Agent, or Firm* — Cantor Colburn LLP; Teddi Maranzano

(57) ABSTRACT

Aspects include receiving a request from a requesting system to move data from a source memory on a source system to a target memory on a target system. The receiving is at a first hardware engine configured to access the source memory and the target memory. In response to receiving the request, the first hardware engine reads the data from the source memory and writes the data to the target memory. In response to the reading being completed, the first hardware engine transmits a data clearing request to a second hardware engine that is configured to access the source memory. The data clearing request specifies a location of the data in the source memory to be cleared.

11 Claims, 5 Drawing Sheets

SELF-CLEARING DATA MOVE ASSIST (DMA) ENGINE

BACKGROUND

The present invention relates generally to computer processing, and more specifically, to a self-clearing data move assist (DMA) engine.

DMA is short for "data move assist" or "direct memory access" which refers to a feature of computer systems that allow certain hardware subsystems to access main system memory independently of the central processing unit (CPU). Without DMA, when the CPU is using programmed input/output (I/O) it is typically fully occupied for the entire duration of the read or write operation, and is thus unavailable to perform other work. With DMA, the CPU first initiates the data transfer, then the CPU can perform other operations while the transfer is in progress. The CPU receives an interrupt from the DMA controller, or DMA engine, when the I/O operation is completed. The use of a DMA is useful any time that the CPU cannot keep up with the rate of data transfer or when the CPU needs to perform other work while waiting for an I/O data transfer to complete. Many hardware systems use DMA, including disk drive controllers, graphics cards, network cards, and sound cards. DMA is also used for intra-chip data transfer in multi-core processors. Computers that have DMA channels can transfer data to and from devices with much less CPU overhead than computers without DMA channels. Similarly, a processing element inside a multi-core processor can transfer data to and from its local memory without occupying its processor time, allowing computation and data transfer to proceed in parallel.

Security in computer hardware, such as DMA engines, is becoming increasingly important since the hardware is being used more often by multiple independent users in virtualized environments like cloud systems. Even without malicious intent, the expanding use of virtualization in I/O adapters makes it possible that the workload of one process will be overlaid into the remains of the work space of another process, making it possible for the latter process to see data left behind. Unless software actively clears that memory, sensitive data may be left exposed, visible to unrelated and perhaps unsecured processes.

SUMMARY

Embodiments of the present invention are directed to a self-clearing data move assist (DMA) engine. A non-limiting example computer-implemented method includes receiving a request from a requesting system to move data from a source memory on a source system to a target memory on a target system. The receiving is at a first hardware engine configured to access the source memory and the target memory. In response to receiving the request, the first hardware engine reads the data from the source memory and writes the data to the target memory. In response to the reading being completed, the first hardware engine transmits a data clearing request to a second hardware engine that is configured to access the source memory. The data clearing request specifies a location of the data in the source memory to be cleared.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagrams, or the operations described therein without departing from the spirit of the invention. For instance, the actions can be performed in a differing order or actions can be added, deleted or modified. Also, the term "coupled", and variations thereof describe having a communications path between two elements and do not imply a direct connection between the elements with no intervening elements/connections between them. All of these variations are considered a part of the specification.

DETAILED DESCRIPTION

One or more embodiments of the present invention provide a data move assist engine (DMA) engine that automatically clears out the data that it reads from a source memory location after it has moved the data to a target memory location. Thus, one or more embodiments of the present invention prevent any subsequent processes from viewing the data at the source location after it has been moved to its new owner, or location.

Current approaches to clearing out a source location after it has been moved include a DMA engine issuing an interrupt to the requesting host processor when the data move has been completed. The host processor then issues a new command to the DMA engine to clear the data at the source location, for example by writing all zeros or random data to the source location. Contemporary approaches to clearing a source location are software driven and require two interrupts to the central processing unit (CPU) on the host processor, one when the data move is complete and the other when the clearing operation is complete. Depending on how long it takes for the CPU to issue the clear command, there is a chance that another process may already be using the source location and therefore possibly reading data that it should not.

One or more embodiments of the present invention address one or more of the above noted deficiencies of contemporary systems by embedding the clearing functionality into hardware. This prevents the clearing process from being subverted by software processes. In addition, performance is improved by not having a separate operation invoked to clear the memory subsequent to the data being moved to the target location. Furthermore, when interfacing to dynamic random access memory (DRAM), performance is improved by having the wipe, or clearing, executed close in time to the transfer, or movement, being performed due to the DRAM banks being likely to be still open and in a lower latency state.

Figure 1:
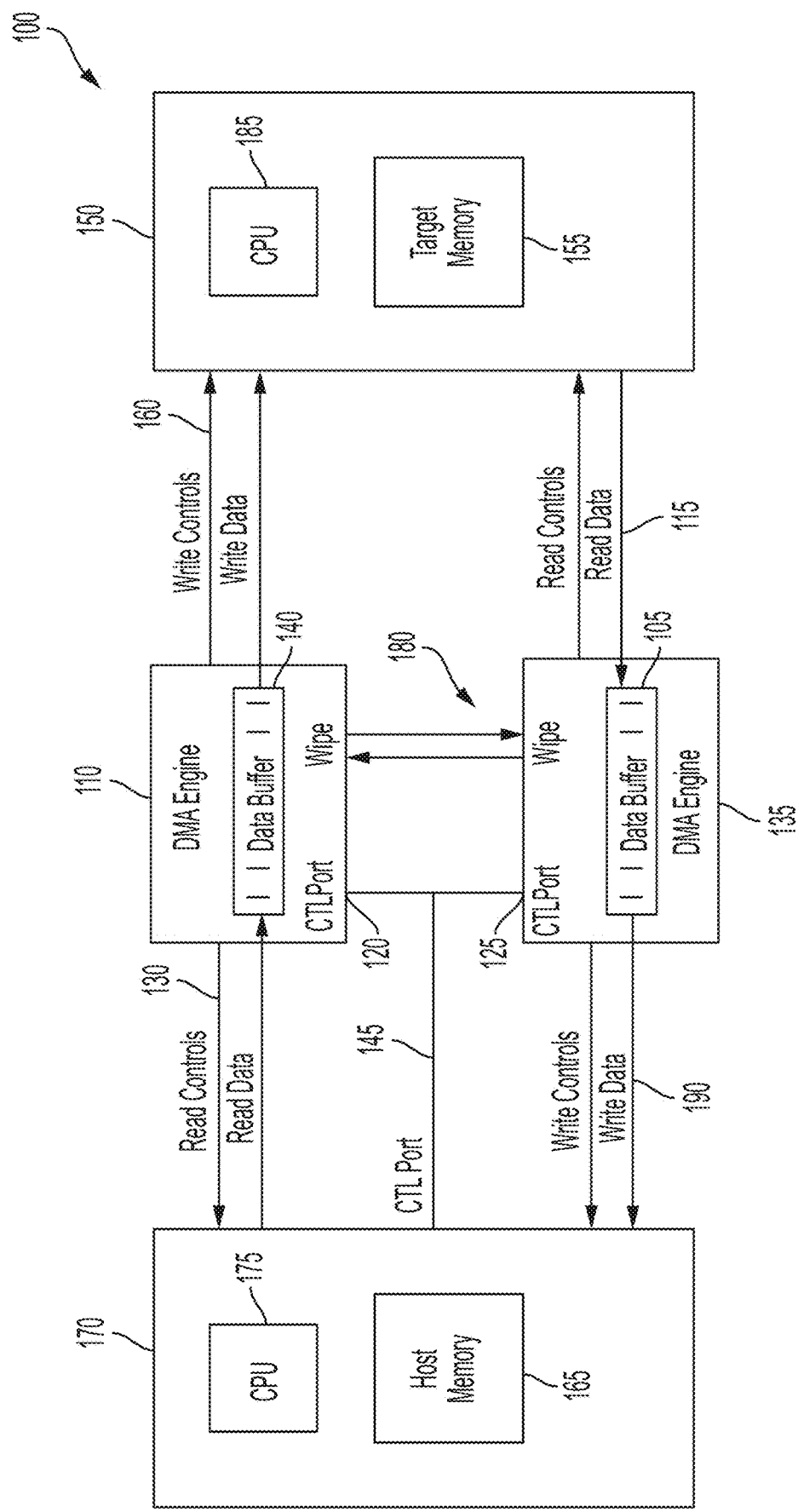
FIG. 1 depicts a block diagram of a system for providing a self-clearing data move assist (DMA) engine according to one or more embodiments of the present invention.

Turning now to FIG. 1, a block diagram 100 of a system for providing a self-clearing DMA engine is generally shown in accordance with one or more embodiments of the present invention. All or a portion of each of the components shown in FIG. 1 can be implemented by computer 501 of FIG. 5 and/or by a cloud computing node 10 of FIG. 3. The components shown in the embodiment of FIG. 1 include a host system 170, DMA engine 110, DMA engine 135, and target system 150.

The host system 170 shown in FIG. 1 includes, among other elements, central processing unit (CPU) 175 and host memory 165. The target system 150 shown in FIG. 1 includes, among other elements, CPU 185 and target memory 155. The labels "host system" and "target system" refer to the processing performed by each of the processors in the data movement process described herein, with the host system 170 controlling the DMA engines 110 135 to perform the data movement. In accordance with one or more embodiments of the present invention, the target system 150 can be a local system such as a laptop or other mobile device.

The DMA engine 110 shown in FIG. 1 includes a read port (not shown) that is connected to a read channel 130, and the read channel 130 is coupled to host memory 165. The read channel 130 includes a read controls bus for specifying particular locations (e.g., by address and length) on the host memory 165 and a read data bus for returning the data that was read to a data buffer 140 on the DMA engine 110. The DMA engine 110 also includes a write port (not shown) that is connected to a write channel 160, and the write channel 160 is coupled to target memory 155. The write channel 160 includes a write controls bus for specifying a location in the target memory 155 and a write data bus for transferring the data from the data buffer 140 to the location in the target memory 155. DMA engine 110 of FIG. 1 is a state machine or processor, in full duplex mode that includes bus attached read and write ports that are configured so that the read and write ports are coupled through data buffer 140.

DMA engine 135 shown in FIG. 1 includes a read port (not shown) that is connected to a read channel 115 which is connected to target memory 155. The read channel 115 includes a read controls bus for specify particular locations (e.g., by address and length) on the target memory 155 and a read data bus for returning the data that was read from the host memory 165 to a data buffer 105 on the DMA engine 135. The DMA engine 135 also includes a write port (not shown) that is connected to a write channel 190 which is connected to host memory 165. The write channel 190 includes a write controls bus for specifying a location in the host memory 165 and a write data bus for transferring the data from the data buffer 105 to the location in the host memory 165. DMA engine 135 is a state machine or processor, in full duplex mode that includes bus attached read and write ports connected so that the read and write ports are coupled through data buffer 105.

As shown in FIG. 1, DMA engine 110 and DMA engine 135 are symmetrically instantiated so that DMA engine 110 issues reads to host memory 165 and writes to target memory 155, and DMA engine 135 independently issues reads to target memory 155 and writes to host memory 165, thereby allowing data movement to be controlled in both directions. Control of DMA engine 110 is via control port 120 and control of DMA engine 135 is via control port 125. As shown in the embodiment of FIG. 1, the CPU 175 of host system 170 sends the descriptors, via a control port (not shown) on the host system 170 and a control channel 145 to control port 120 on DMA engine 110 and/or to control port 125 on DMA engine 135. The control ports 120 125 write descriptors which are sequential instructions describing to the DMA engines 110 135 where the data is to be moved to/from (addresses) and how much data to move (length). The DMA engines 110 135 include descriptor parsers to determine actions to take based on the received descriptors. In accordance with one or more embodiments of the present invention, the DMA engine descriptor parsers in the DMA engines 110 135 can support multiple channels and they can keep several independent sequences of transfers processing concurrently.

As shown in the embodiment in FIG. 1 data clearing control channel 180 is cross coupled between the two duplexed DMA engines 110 135. In accordance with one or more embodiments of the present invention, the CPU 175 issues a move, or read/write (R/W) descriptor to DMA engine 110. The move descriptor specifies a number of bits to read, or length, starting at a specified address in the host memory 165, as well as an address in the target memory 155 where the data should be written. In response to receiving the move descriptor, the DMA engine 110 will read the data from the host memory 165, write the data to the target memory 155, and remove the data from the host memory 165.

In accordance with one or more embodiments of the present invention, after the read phase of DMA engine 110 is completed, the read portion of the move descriptor sent to the control port 120 of the DMA engine 110 (read address and length) is queued, via data clearing control channel 180 into DMA engine 135 to issue a write request back to the original read address and length to remove, or wipe, the data from the host memory 165 at the memory location(s) specified by the read address and length. In accordance with one or more embodiments of the present invention, all zeros or all ones are written at the read address location for the specified length. In accordance with one or more embodiments of the present invention, a series of random bits or an arbitrary meaningless data pattern is written to the memory location(s) specified by the read address and length. In this manner, the original data in the host memory is cleared such that the only remaining copy of the data is at the target address in the target memory 155.

Similar processing can be performed when the data is read from target memory 155 and written to host memory 165. In this scenario, after the read phase of DMA engine 135 is completed, the read portion of the move descriptor sent to the control port 125 of the DMA engine 135 (read address and length) is queued, via data clearing control channel 180 into DMA engine 110 to issue a write request back to the original read address and length to remove, or wipe, the data from the target memory 155 at the memory location(s) specified by the read address and length. In accordance with one or more embodiments of the present invention, all zeros or all ones are written at the read address location for the specified length. In accordance with one or more embodiments of the present invention, a series of random bits or an arbitrary meaningless data pattern is written to the memory location(s) specified by the read address and length. In this manner, the original data in the target memory 155 is cleared such that the only remaining copy of the data is at the target address in the host memory 165.

The embodiments described herein with respect to block diagram 100 of FIG. 1 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 2:
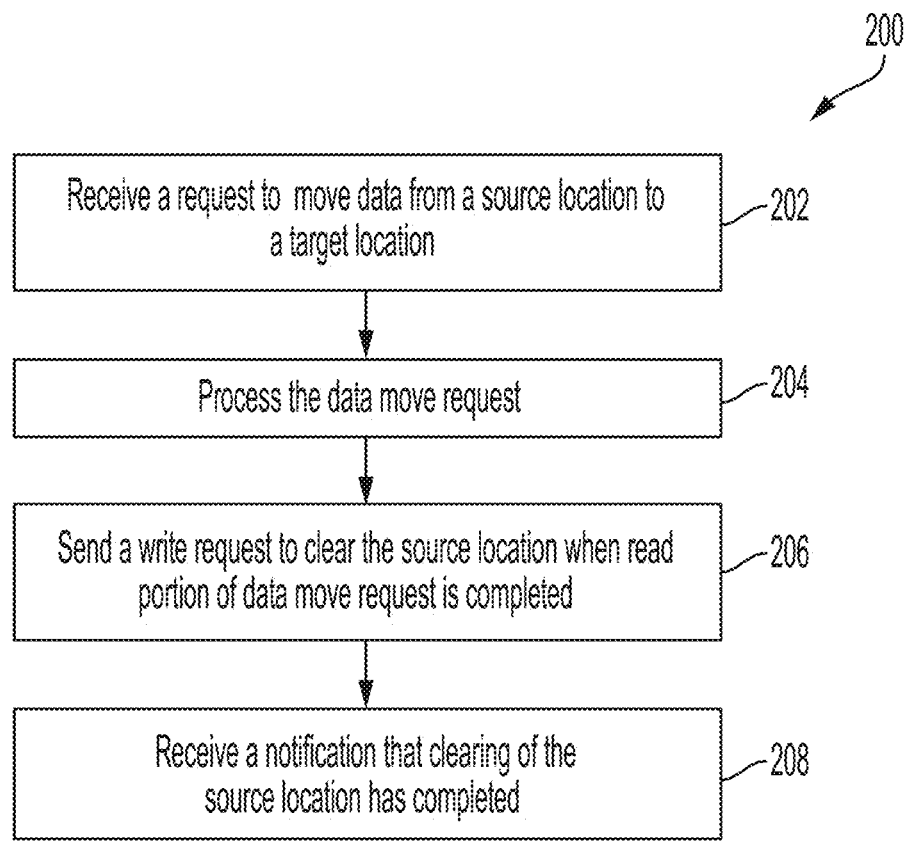
FIG. 2 depicts a flow diagram of a method performed by a self-clearing DMA engine according to one or more embodiments of the present invention.

Turning now to FIG. 2, a flow diagram of a method 200 performed by a self-clearing DMA engine is generally shown in accordance with one or more embodiments of the present invention. All or a portion of the processing shown in FIG. 2 can be performed, for example, by DMA engine 110 or DMA engine 135 of FIG. 1.

At block 202 of FIG. 2, a request is received to move data from a source location to a target location. The request is received at a first hardware engine that is configured to read from the source location and to write to the target location. In accordance with one or more embodiments of the present invention, where the first hardware engine is a DMA engine that is coupled to another DMA engine, an instantiation of one of two of the coupled DMA engines receives a data move request in the form of a descriptor, where the request is received via a control port of the DMA engine. In accordance with one or more embodiments of the present invention, the descriptor includes a list of instructions including a read address (corresponding to the address space of the memory on the read port), a write address (corresponding to the address space of the memory on the write port), and a data count, or length, indicating how much data to move from the read space to the write space. In accordance with one or more embodiments of the present invention, descriptors may be chained to subsequent descriptors and may also contain various address space identifiers (process identifiers, etc.).

For example, referring to components shown in FIG. 1, the first hardware engine can be implemented by DMA engine 110 which is coupled to DMA engine 135 via data clearing control channel 180. In this example, the processing performed at block 202 of FIG. 2 includes a descriptor being can be sent to the DMA engine 110 by CPU 175 of host system 170 via control channel 145. The descriptor may specify a read address in the host memory 165, a write address in the target memory 155, and a data count of the number of bits or bytes to be moved (starting at the read address).

At block 204, the data move request is processed by the first hardware engine. In accordance with one or more embodiments of the present invention, the processing includes reading data from the source memory and writing the data to the target memory. When the reading portion of the processing at block 204 is complete, the processing at block 206 can be performed to remove the data from the source memory. The processing at block 206 is initiated by the first hardware engine transmitting a request to a second hardware engine to remove, or clear, the data from the source memory. In response to receiving the request, the second hardware engine clears the location in the source memory for example, by writing all zeros or a random value to the location in the source memory. In accordance with one or more embodiments of the present invention, the processing at block 206 overlaps in time with the processing in block 204, specifically with the writing of the data to the target memory.

Referring to the example above, at block 204, the read portion of the descriptor is executed using read channel 130 which results in the data being moved into the data buffer 140 of DMA engine 110. Next, the write portion of the descriptor is executed using write channel 160 to move the data from the buffer 140 of the DMA engine 110 into the target memory 155 of the target system 150. In accordance with one or more embodiments of the present invention, once the data has been moved into the data buffer 140 of DMA engine 110, the processing at block 206 can be performed. At block 206, the descriptor received at block 202 is requeued onto data clearing control channel 180 as a write request to DMA engine 135. In accordance with one or more embodiments of the present invention the requeued descriptor is generated by DMA engine 110 by taking the descriptor received at block 202 and modifying it to generate a write request to the source memory location. The write request can specify a value to be written to clear the source memory location. The writing is performed by DMA engine 135 via write channels 190. Note that the read channel 115 is not used in this mode.

At block 208, the first hardware engine receives a notification from the second hardware engine that it has completed the clearing of the source memory location. In response to receiving the notification, the first hardware engine can notify the requesting system that the request to move data has completed. In accordance with one or more embodiments of the present invention, the notification to the requesting system can be deferred until all parts of the descriptor have been executed (including the data movement and the clearing).

Referring back to the example above, once the wiping write is completed by DMA engine 135, DMA engine 110 is notified of the successful completion of this clearing through the secondary, or data clearing control channel 180, and DMA engine 110 resolves this portion of the descriptor list as complete.

In accordance with one or more embodiments of the present invention, the processing shown in FIG. 2 is pipelined so that reads of DMA engine 110 may get ahead of the wipes performed by DMA engine 135. In this mode, the DMA engine 110 "scoreboards" all the pending completions. When all data moves and dependent wipes are completed, the DMA engine 110 notifies the CPU 175 of host system 170 of the overall completion status of the competed descriptor chain via control port 120. This entire process can be done concurrently or sequential by initiating the descriptor on either control port 120 or 125. Should an exception occur (either within the DMA engine itself or via an error indication on the coupled buses), the detecting engine can notify the CPU 175 in the host system 170 via the control port 120 that the action and/or coupled wipe did not finish properly and that host interaction is required before that memory can be reused.

An example descriptor list follows:

sourceAddr=16, destinationAddr=256 len=16 (implied wipe of 16-31)

sourceAddr=32, destinationAddr=272 len=16 (implied wipe of 32-47)

sourceAddr=128, destinationAddr=288 len=16 (implied wipe of 128-143)

In this example, in accordance with one or more embodiments of the present invention, the requesting CPU can be notified once after all three parts of the descriptor list have been executed, that is when the data has been moved from the source memory locations to the destination (or target) memory locations and the data has been cleared from the source memory locations. In accordance with one or more other embodiments of the present invention, the requesting CPU can be notified after each part of the descriptor list has been executed.

The process flow diagram of FIG. 2 is not intended to indicate that the operations are to be executed in any particular order, or that all of the operations shown in FIG. 2 are to be included in every case. Additionally, the processing shown in FIG. 2 can include any suitable number of additional operations.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 3:
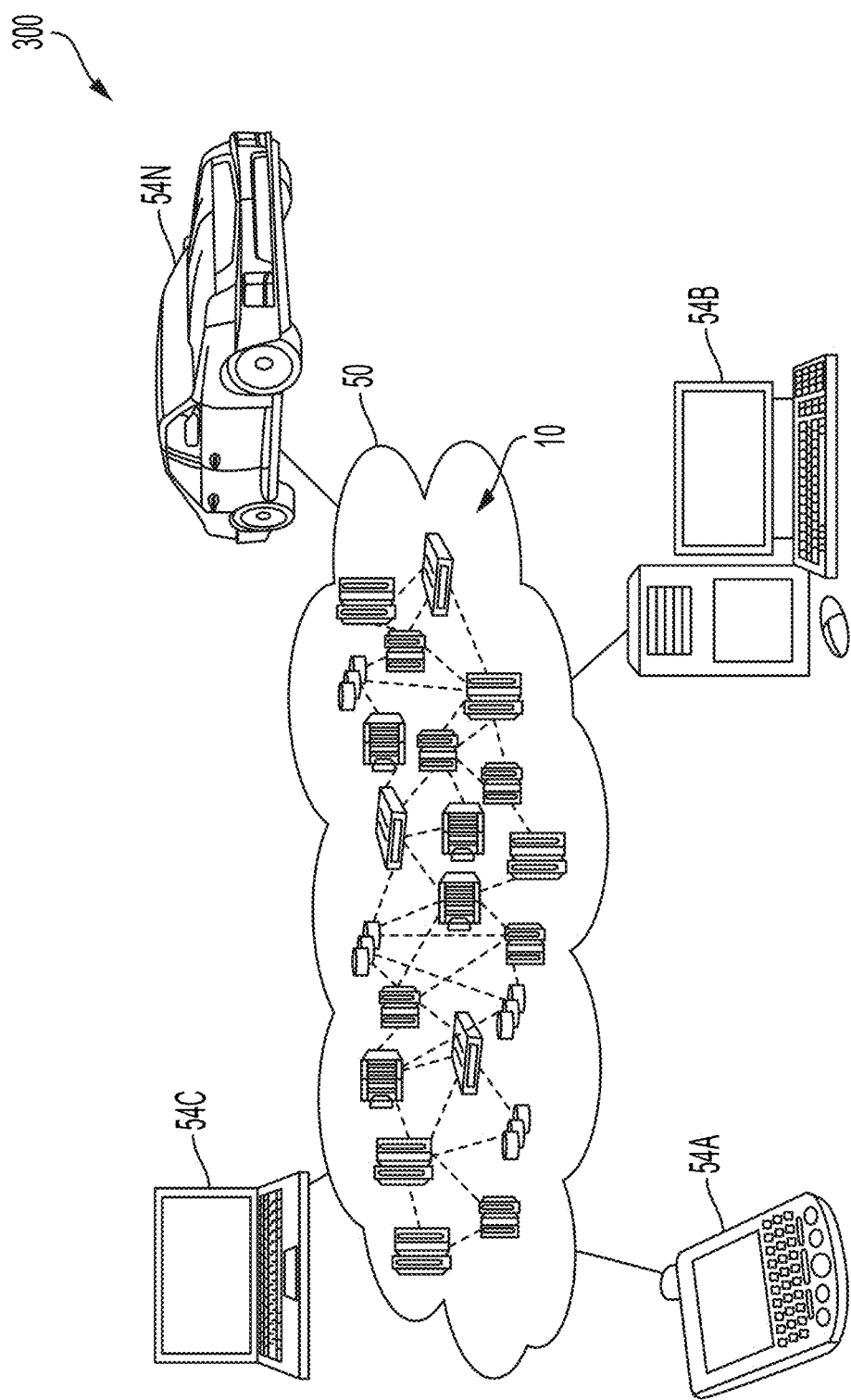
FIG. 3 depicts a cloud computing environment according to one or more embodiments of the present invention.

Referring now to FIG. 3, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 3 are intended to be illustrative only and that computing nodes 10 and cloud computing environment 50 can communicate with any type of computerized device over any type of network and/or network addressable connection (e.g., using a web browser).

Figure 4:
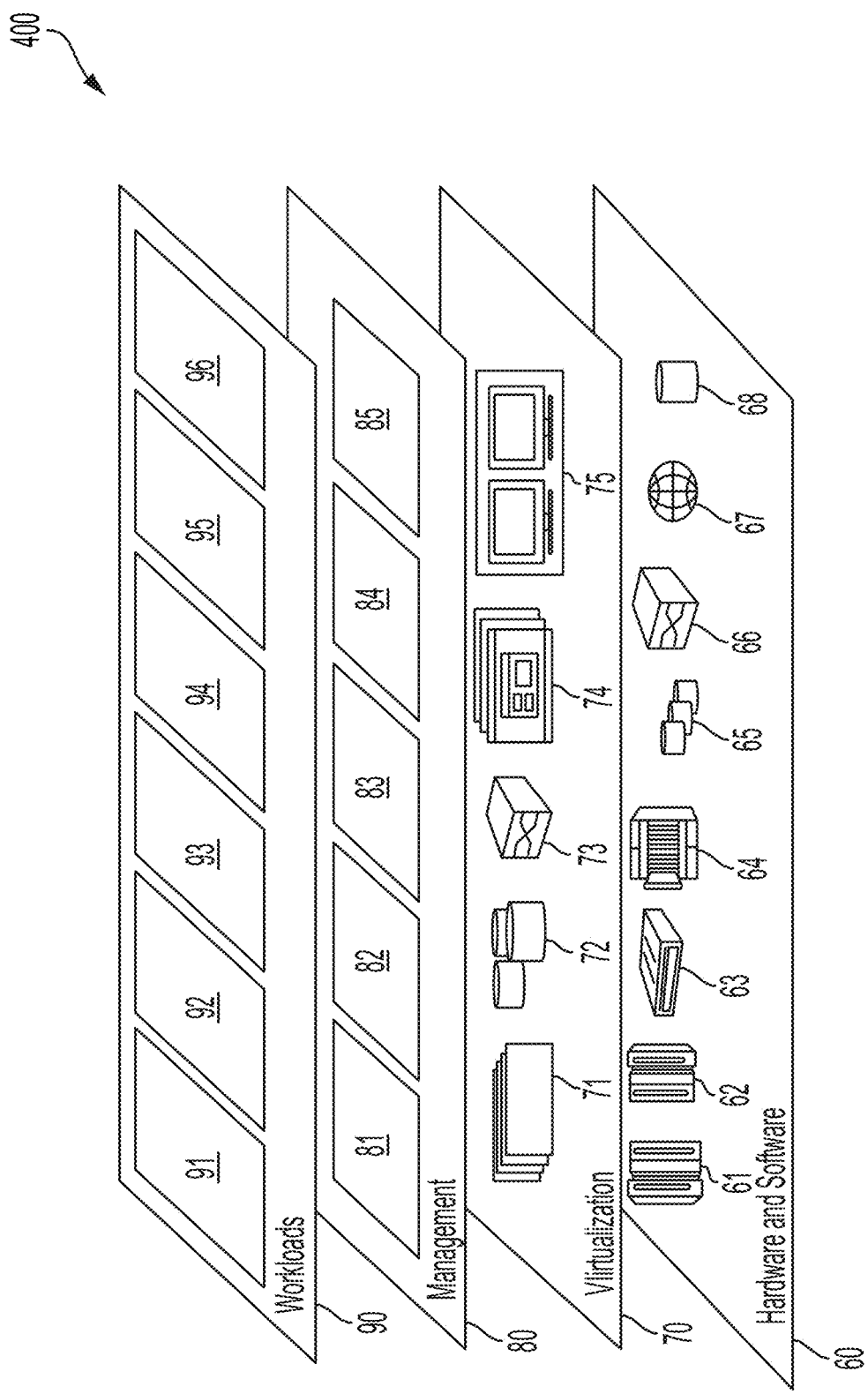
FIG. 4 depicts abstraction model layers according to one or more embodiments of the present invention.

Referring now to FIG. 4, a set of functional abstraction layers provided by cloud computing environment 50 (FIG. 3) is shown. It should be understood in advance that the components, layers, and functions shown in FIG. 4 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and data encryption/decryption 96.

It is understood that one or more embodiments of the present invention are capable of being implemented in conjunction with any type of computing environment now known or later developed.

Figure 5:
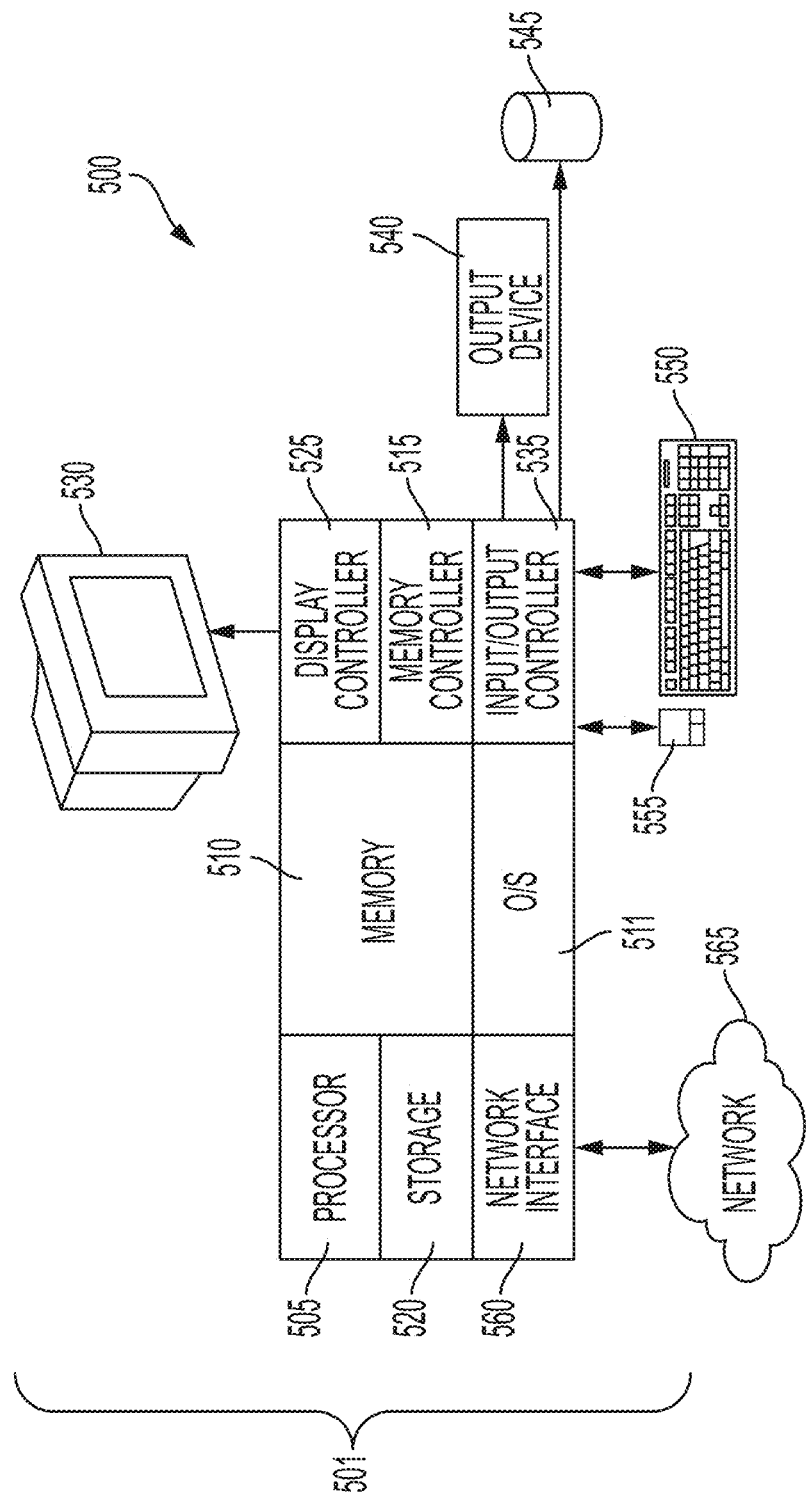
FIG. 5 illustrates a system for providing a self-clearing DMA engine according to one or more embodiments of the present invention.

Turning now to FIG. 5, a computer system 500 for performing textbook content reorganization based on classroom analytics is generally shown in accordance with one or more embodiments of the present invention. All or a portion of the computer system 500 shown in FIG. 5 can be implemented by one or more cloud computing nodes 10 of FIG. 3. The methods described herein can be implemented in hardware, software (e.g., firmware), or a combination thereof. In one or more exemplary embodiments of the present invention, the methods described herein are implemented in hardware as part of the microprocessor of a special or general-purpose digital computer, such as a personal computer, workstation, minicomputer, or mainframe computer. The system 500 therefore may include general-purpose computer or mainframe 501 capable of running multiple instances of an O/S simultaneously.

In one or more exemplary embodiments of the present invention, in terms of hardware architecture, as shown in FIG. 5, the computer 501 includes one or more processors 505, memory 510 coupled to a memory controller 515, and one or more input and/or output (I/O) devices 540, 545 (or peripherals) that are communicatively coupled via a local input/output controller 535. The input/output controller 535 can be, for example but not limited to, one or more buses or other wired or wireless connections, as is known in the art. The input/output controller 535 may have additional elements, which are omitted for simplicity, such as controllers, buffers (caches), drivers, repeaters, and receivers, to enable communications. Further, the local interface may include address, control, and/or data connections to enable appropriate communications among the aforementioned components. The input/output controller 535 may include a plurality of sub-channels configured to access the output devices 540 and 545. The sub-channels may include fiber-optic communications ports.

The processor 505 is a hardware device for executing software, particularly that stored in storage 520, such as cache storage, or memory 510. The processor 505 can be any custom made or commercially available processor, a central processing unit (CPU), an auxiliary processor among several processors associated with the computer 501, a semiconductor based microprocessor (in the form of a microchip or chip set), a macroprocessor, or generally any device for executing instructions.

The memory 510 can include any one or combination of volatile memory elements (e.g., random access memory (RAM, such as DRAM, SRAM, SDRAM, etc.)) and non-volatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 510 may incorporate electronic, magnetic, optical, and/or other types of storage media. Note that the memory 510 can have a distributed architecture, where various components are situated remote from one another, but can be accessed by the processor 505.

The instructions in memory 510 may include one or more separate programs, each of which comprises an ordered listing of executable instructions for implementing logical functions. In the example of FIG. 5, the instructions in the memory 510 a suitable operating system (OS) 511. The operating system 511 essentially controls the execution of other computer programs and provides scheduling, input-output control, file and data management, memory management, and communication control and related services.

In accordance with one or more embodiments of the present invention, the memory 510 may include multiple logical partitions (LPARs) each running an instance of an operating system. The LPARs may be managed by a hypervisor, which may be a program stored in memory 510 and executed by the processor 505.

In one or more exemplary embodiments of the present invention, a conventional keyboard 550 and mouse 555 can be coupled to the input/output controller 535. Other output devices such as the I/O devices 540, 545 may include input devices, for example but not limited to a printer, a scanner, microphone, and the like. Finally, the I/O devices 540, 545 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The system 500 can further include a display controller 525 coupled to a display 530.

In one or more exemplary embodiments of the present invention, the system 500 can further include a network interface 560 for coupling to a network 565. The network 565 can be an IP-based network for communication between the computer 501 and any external server, client and the like via a broadband connection. The network 565 transmits and receives data between the computer 501 and external systems. In an exemplary embodiment, network 565 can be a managed IP network administered by a service provider. The network 565 may be implemented in a wireless fashion, e.g., using wireless protocols and technologies, such as WiFi, WiMax, etc. The network 565 can also be a packet-switched network such as a local area network, wide area network, metropolitan area network, Internet network, or other similar type of network environment. The network 565 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 501 is a PC, workstation, intelligent device or the like, the instructions in the memory 510 may further include a basic input output system (BIOS) (omitted for simplicity). The BIOS is a set of essential software routines that initialize and test hardware at startup, start the OS 511, and support the transfer of data among the hardware devices. The BIOS is stored in ROM so that the BIOS can be executed when the computer 501 is activated.

When the computer 501 is in operation, the processor 505 is configured to execute instructions stored within the memory 510, to communicate data to and from the memory 510, and to generally control operations of the computer 501 pursuant to the instructions. In accordance with one or more embodiments of the present invention, computer 501 is an example of a cloud computing node 10 of FIG. 3.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discreet logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A method comprising:
   receiving a request from a requesting system to move data from a source memory on a source system to a target memory on a target system, the receiving at a first hardware engine configured to access the source memory and the target memory;
   performing, by the first hardware engine, in response to receiving the request to move the data from the source memory to the target memory:
      reading the data from the source memory;
      writing the data to the target memory;
   in response to the reading being completed, transmitting a data clearing request to a second hardware engine configured to access the source memory, the data clearing request specifying a location of the data in the source memory to clear,
   wherein the first hardware engine is a first data move assist (DMA) engine and the second hardware engine is a second DMA engine coupled to the first DMA engine via a control channel for initiating the data clearing request on the second DMA engine, and
   wherein the request to move data from the source memory to the target memory comprises a descriptor, the descriptor comprising a read address in the source memory, a write address in the target memory, and a length of the data; and
   generating, by the first DMA engine, the data clearing request, the generating comprising modifying the descriptor by removing the write address in the target memory and changing the read address in the source memory to a write address in the source memory.

2. The method of claim 1, further comprising:
   receiving, at the first hardware engine, a first notification from the second hardware engine indicating that the data clearing request has completed; and
   in response to receiving the first notification, transmitting a second notification to the requesting system, the second notification indicating that the request to move data from the source memory to the target memory has completed.

3. The method of claim 1, wherein the request is received from a central processing unit (CPU) of a host system.

4. The method of claim 1, wherein the data clearing request is executed by the second hardware engine and the executing comprises overwriting the data in the source memory with one or both of static and random bits.

5. A system comprising:
   one or more processors for executing computer-readable instructions, the computer-readable instructions controlling the one or more processors to perform operations comprising:
      receiving a request from a requesting system to move data from a source memory on a source system to a target memory on a target system, the receiving at a first hardware engine configured to access the source memory and the target memory;
      performing, by the first hardware engine, in response to receiving the request to move the data from the source memory to the target memory:
         reading the data from the source memory;
         writing the data to the target memory;
      in response to the reading being completed, transmitting a data clearing request to a second hardware engine configured to access the source memory, the data clearing request specifying a location of the data in the source memory to clear,
      wherein the first hardware engine is a first data move assist (DMA) engine and the second hardware engine is a second DMA engine coupled to the first DMA engine via a control channel for initiating the data clearing request on the second DMA engine, and
      wherein the request to move data from the source memory to the target memory comprises a descriptor, the descriptor comprising a read address in the source memory, a write address in the target memory, and a length of the data; and
   generating, by the first DMA engine, the data clearing request, the generating comprising modifying the descriptor by removing the write address in the target memory and changing the read address in the source memory to a write address in the source memory.

6. The system of claim 5, wherein the operations further comprise:
   receiving, at the first hardware engine, a first notification from the second hardware engine indicating that the data clearing request has completed; and
   in response to receiving the first notification, transmitting a second notification to the requesting system, the second notification indicating that the request to move data from the source memory to the target memory has completed.

7. The system of claim 5, wherein the request is received from a central processing unit (CPU) of a host system.

8. The system of claim 5, wherein the data clearing request is executed by the second hardware engine and the executing comprises overwriting the data in the source memory with one or both of static and random bits.

9. A computer program product comprising a computer-readable storage medium having program instructions embodied therewith, the program instructions executable by one or more processors to cause the one or more processors to perform operations comprising:
   one or more processors for executing computer-readable instructions, the computer-readable instructions controlling the one or more processors to perform operations comprising:
      receiving a request from a requesting system to move data from a source memory on a source system to a target memory on a target system, the receiving at a first hardware engine configured to access the source memory and the target memory;
      performing, by the first hardware engine, in response to receiving the request to move the data from the source memory to the target memory:
         reading the data from the source memory;
         writing the data to the target memory;

in response to the reading being completed, transmitting a data clearing request to a second hardware engine configured to access the source memory, the data clearing request specifying a location of the data in the source memory to clear, wherein the first hardware engine is a first data move assist (DMA) engine and the second hardware engine is a second DMA engine coupled to the first DMA engine via a control channel for initiating the data clearing request on the second DMA engine, and wherein the request to move data from the source memory to the target memory comprises a descriptor, the descriptor comprising a read address in the source memory, a write address in the target memory, and a length of the data; and generating, by the first DMA engine, the data clearing request, the generating comprising modifying the descriptor by removing the write address in the target memory and changing the read address in the source memory to a write address in the source memory.

10. The computer program product of claim 9, wherein the operations further comprise:

receiving, at the first hardware engine, a first notification from the second hardware engine indicating that the data clearing request has completed; and in response to receiving the first notification, transmitting a second notification to the requesting system, the second notification indicating that the request to move data from the source memory to the target memory has completed.

11. The computer program product of claim 9, wherein the request is received from a central processing unit (CPU) of a host system.

* * * * *